March 1, 1955
H. HORLACHER
2,703,040
MACHINE TOOL CONTROL MECHANISM
Filed Dec. 4, 1951
4 Sheets-Sheet 1
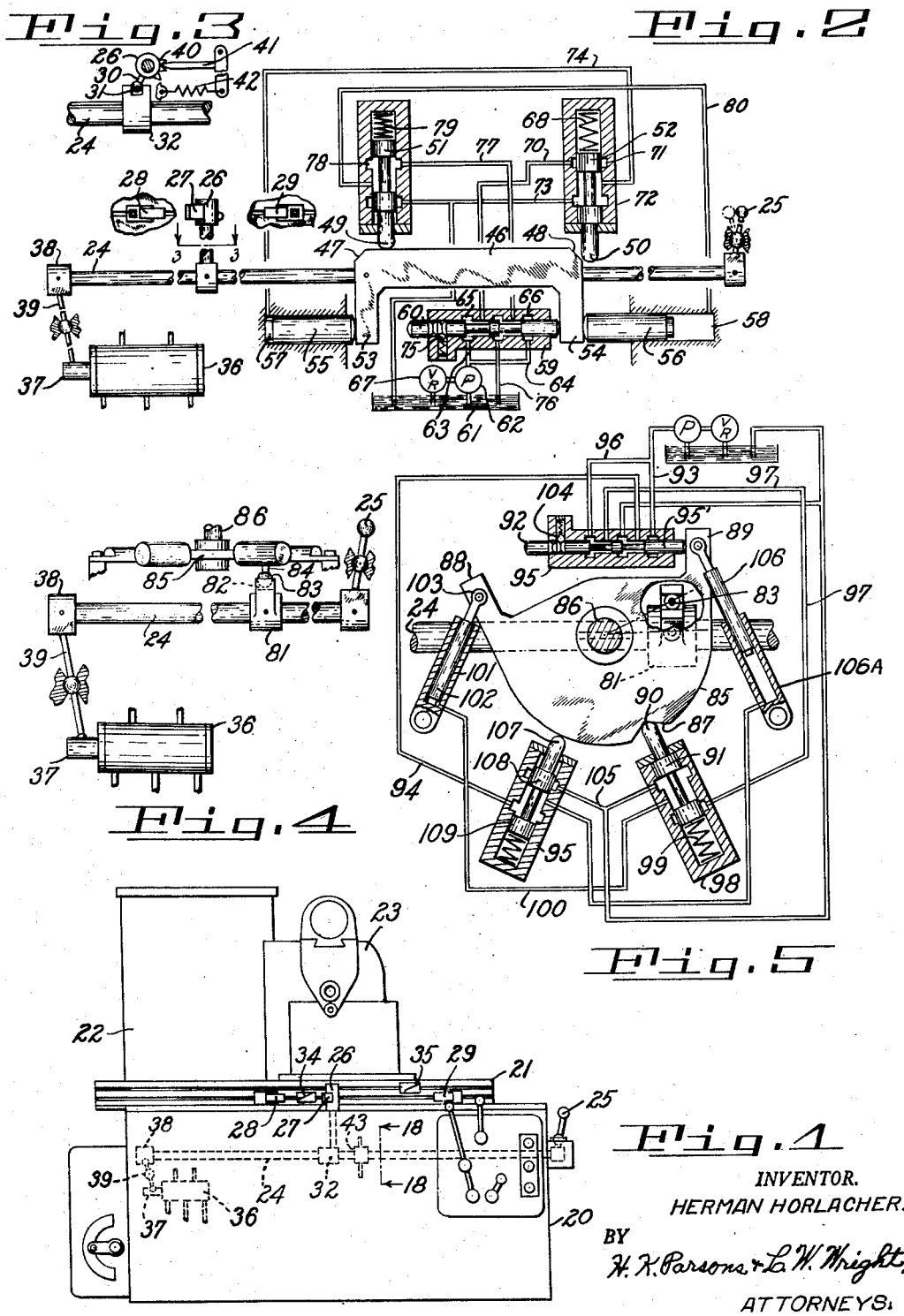
INVENTOR.
HERMAN HORLACHER.
BY
H. K. Parsons + L. W. Wright.
ATTORNEYS.

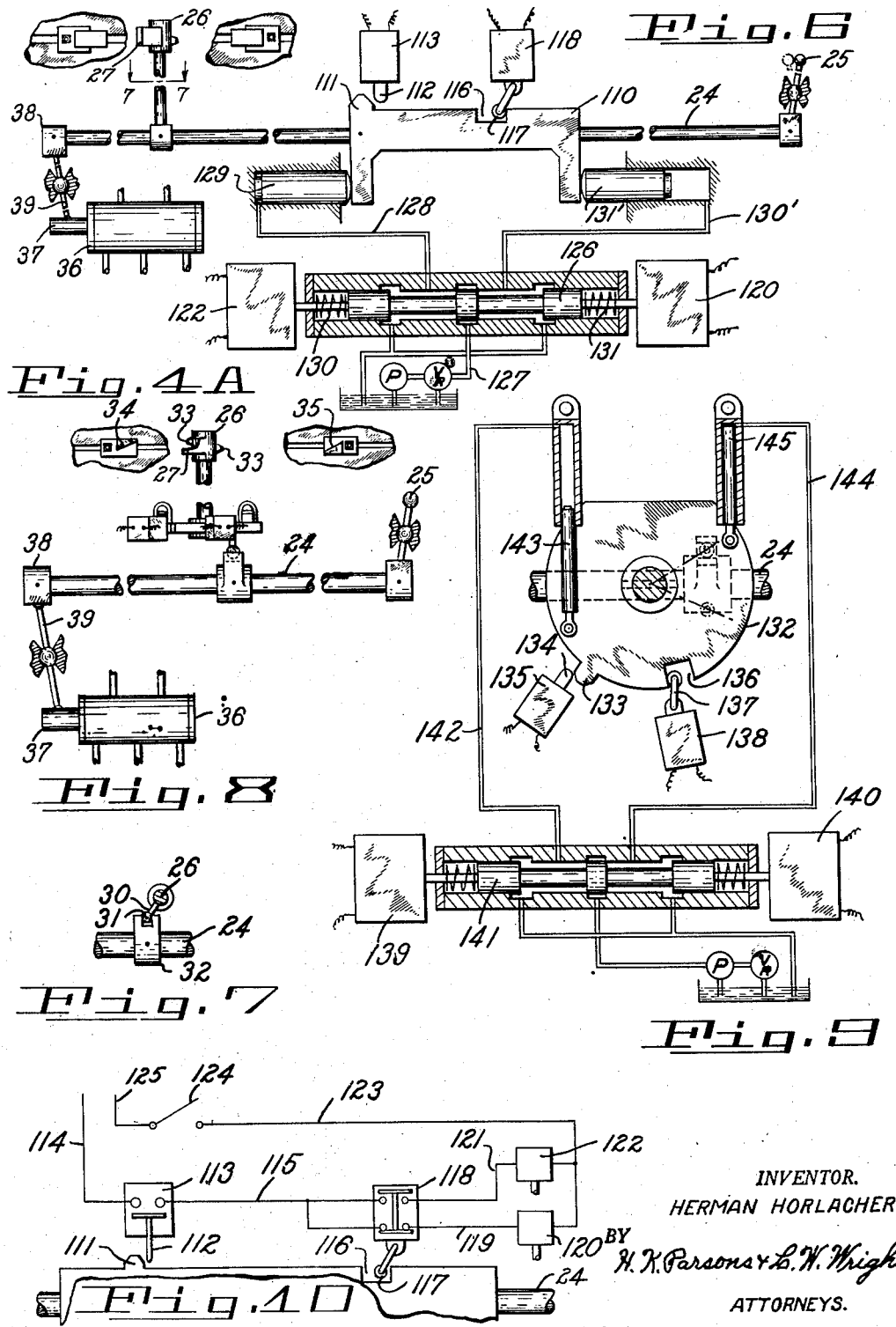

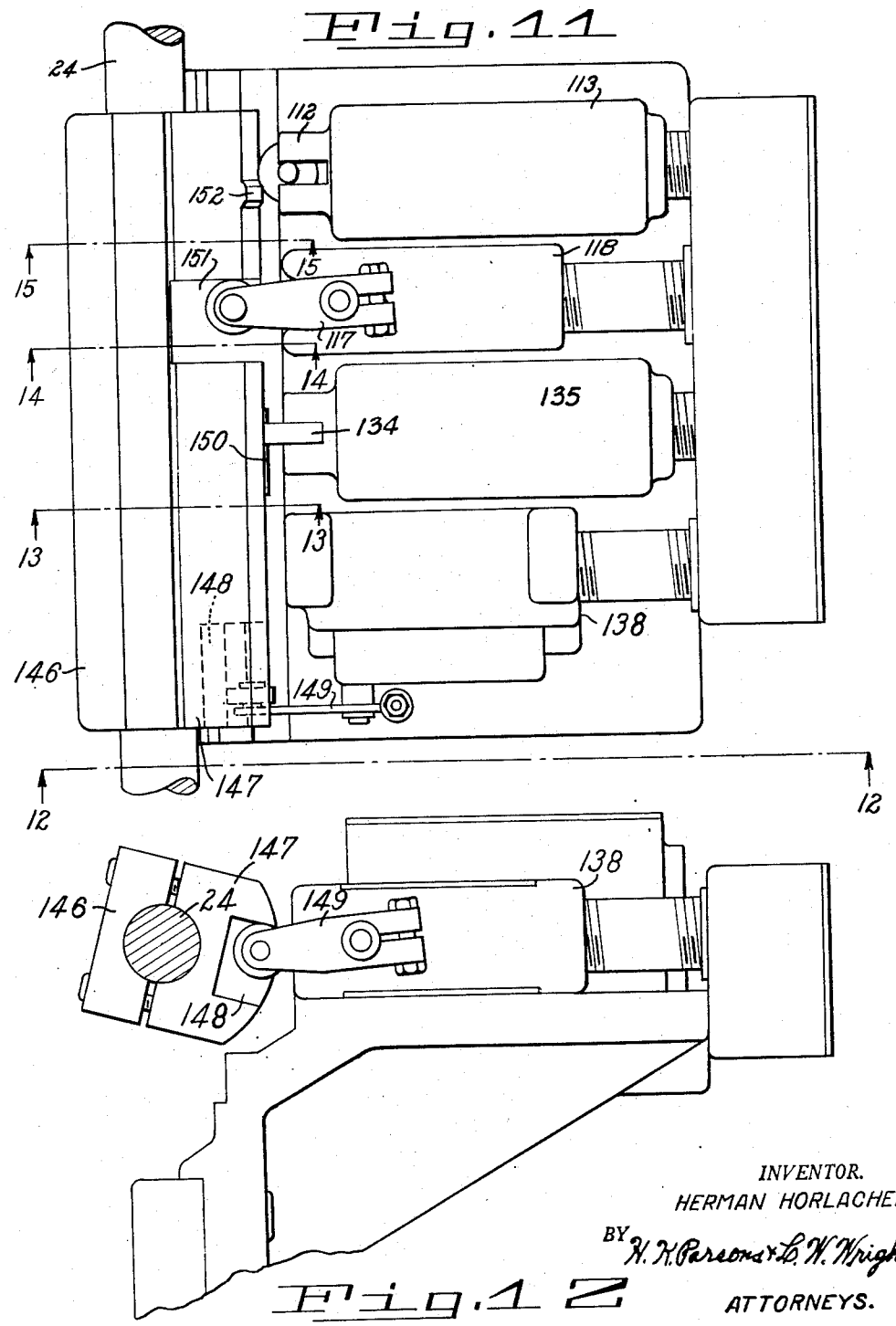

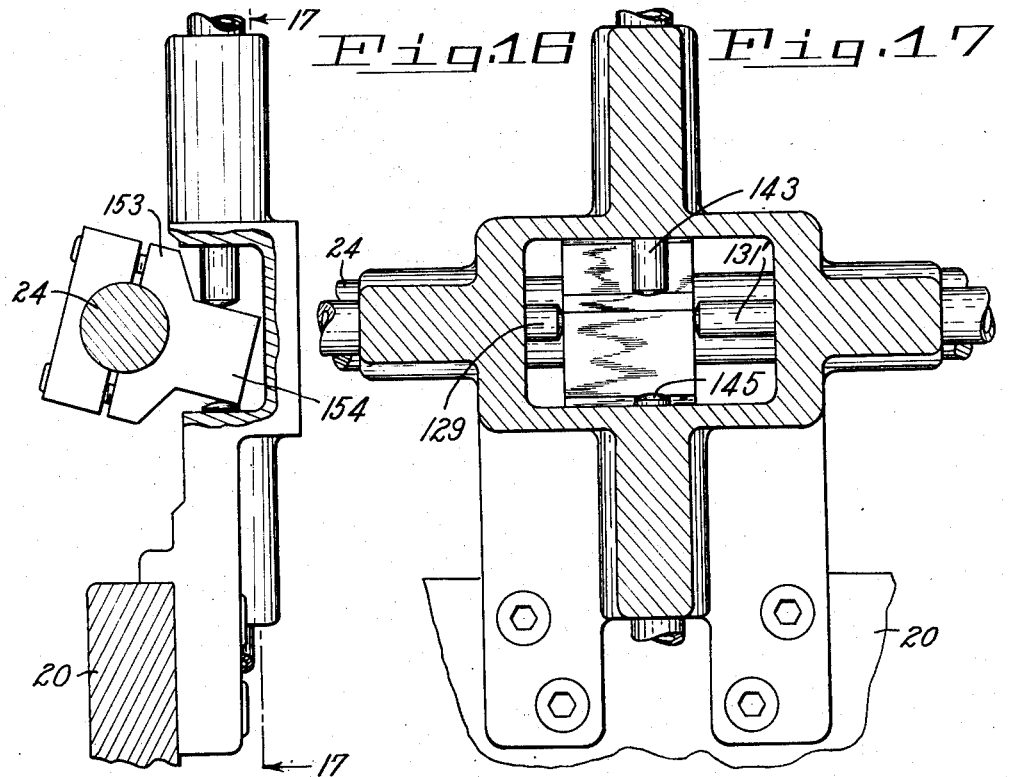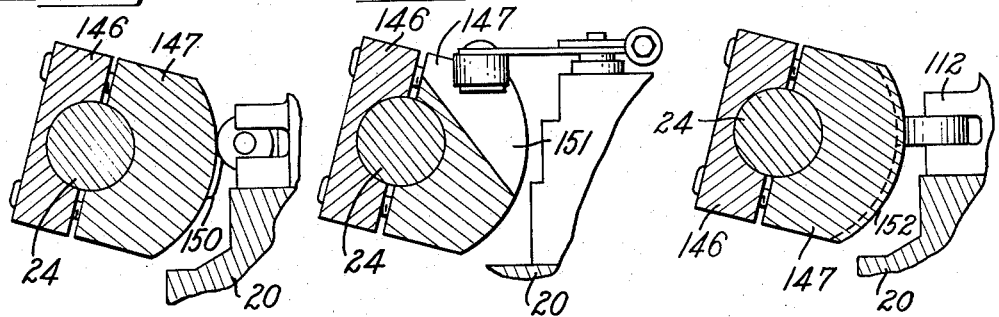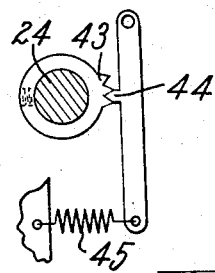

United States Patent Office 2,703,040
Patented Mar. 1, 1955

2,703,040

MACHINE TOOL CONTROL MECHANISM

Herman Horlacher, Cincinnati, Ohio, assignor to The Cincinnati Milling Machine Co., Cincinnati, Ohio, a corporation of Ohio Application December 4, 1951, Serial No. 259,755

9 Claims. (Cl. 90—21.5)

This invention relates to improved control mechanism for machine tools and has particular reference to power mechanism for effecting rapid and accurate operation of the cycle determining mechanism of milling machines or similar machine tools.

One of the objects of the present invention is the provision of a self-energizing detent mechanism which may be built into a machine tool or which alternatively is capable of application to and utilization in connection with certain types of present commercial machines for effecting a more rapid and accurate actuation of existing control members in such machines.

A further object of the invention is the provision of a structure embodying a single power source and a preconditioner or power connector which will be alternatively effective to provide an initial power connection to one actuator and a subsequent disconnection of power therefrom and alternative connection to a different actuator, conditioning the latter for subsequent operation.

A further object of the present invention is the provision of a power operated quick firing detent mechanism activatable by existing machine tool trip mechanisms for relieving the normal power and torque requirements for operation of such mechanisms.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a semi-diagrammatic front elevation of a machine embodying the present invention.

Figure 2 is a diagrammatic view of one form of reverser controlling mechanism embodying the invention.

Figure 3 is a fragmentary sectional view on the line 3—3 of Figure 2.

Figure 4 is a diagrammatic view of an oscillation control mechanism for a cycle selector.

Figure 4a is a fragmentary view of the table dog and plunger control therefor.

Figure 5 is a diagrammatic plan view with parts shown in section of the structure shown in Figure 4.

Figure 6 is a diagrammatic view of a hydro-electric embodiment of the invention as utilized in connection with reciprocation control.

Figure 7 is a fragmentary section on the line 7—7 of Figure 6.

Figure 8 is a plan view of the hydro-electric embodiment as utilized for oscillation control purposes.

Figure 9 is a diagrammatic view partially in section of the embodiment of the invention shown in Figure 8.

Figure 10 is a fragmentary diagrammatic view of an electrical circuit suitable for utilization in connection with the forms shown in Figures 6 and 9.

Figure 11 is a plan view of the switch bracket and actuator for combined oscillatory and reciprocating control rod operations.

Figure 12 is a sectional view on the line 12—12 of Figure 11.

Figures 13, 14, and 15 are sectional views taken on the respective section lines shown in Figure 11.

Figure 16 is a side view, partially in section, of the power shifter bracket with actuating plungers.

Figure 17 is a section through the shifter bracket on the line 17—17 of Figure 16, and Figure 18 is a fragmentary view of an oscillation control detent on the line 18—18 of Figure 1.

The present invention has been illustrated as applied to a commercially known milling machine of the type illustrated, for example, in United States Letters Patent 2,019,486, provided with a specific type of control plunger shown in Patent 1,938,784. Such a machine includes the bed 20 on which is slidably supported a work supporting table 21 for movement of the work relative to the column 22 provided with a spindle carrier 23 for the cutter to operate upon the work. This machine embodies a longitudinally extending control rod 24 mounted for oscillatory and reciprocating movements under control of the handle 25. Additionally, there is carried by the bed and extending upwardly along the edge of the table the dog operable plunger 26 having a wing 27 alternatively engageable by the dogs 28 and 29 on the edge with the table for effecting rocking movements of the plunger. These rocking movements are transmitted through plunger arm 30 and ball and socket connection 31 to the collar 32 secured on rod 24. Thus, oscillation of the plunger will impart a reciprocating movement to the control rod 24. Correspondingly, the plunger is provided with additional lugs as indicated at 33 engageable by dogs 34 and 35 on the table for effecting up and down movement of the plunger. This movement is, in turn, transmitted through the member 30 to effect an oscillation of the member 24. Carried by the machine is the rate and direction selector mechanism comprising the valve casing 36 with contained valve mechanism terminating in a projecting control shaft 37 coupled with collar 38 on the rod 24 by the intermediately pivoted lever mechanism 39. The reciprocatory and oscillatory movement of the member 24 will thus be transmitted by way of lever 39 to effect corresponding movements of the member 37. Ordinarily, reciprocating movements of the member 37 will effect reversal in direction of movement of the table while oscillatory movements will provide a selection between feed and rapid traverse movements of the table. This, however, is dependent on the particular formation of the portings of the controller within casing 36 as has been fully explained in connection with Patent 2,019,486 for example, the present invention relating not to the contained mechanism but to the means for insuring accurate dog controlled actuation of such control mechanism.

In the ordinary operation of the machine tool structure just described, what is known in the art as a load and fire detent mechanism comprising the notched cam 40 and the actuator or detent 41 impelled by spring 42 serves to rapidly shift or fire and complete dog initiated longitudinal movement of the member 24 while a similar load and fire detent mechanism, such as the double notch cam 43 engaged by detent 44 operated by spring 45 effects rapid reverse firing or the oscillatory movement and positioning of the member 24.

In large machine tools, such as the conventional milling machine shown in Figure 1, it will be evident that there is appreciable resistance to dog effected movements of the member 24 due to its size and the several associated parts such as the hand lever 25 and the members 37, 39 which are coupled with member 24. Such resistance may retard the effective operation of the trip mechanism due to a wind-up in the parts or otherwise and in any event presents an appreciable load to be overcome by the action of the moving table and dogs. These conditions also tend to impair the accuracy of reaction of the trip mechanism in production of duplicate parts by the machine. A simplified form of the present invention for overcoming the lag and resistance as respects longitudinal reciprocation of the member 24 and to increase the accuracy of operation of the tripping structure has been diagrammatically shown in Figure 2. As there illustrated, mounted on the rod 24 is a trip block 46 having the beveled corners or trip means 47 and 48 for cooperation respectively with the terminal portions 49 and 50 of the trip valves 51 and 52. The member 46 is in the form of a yoke or inverted U having the depending arms 53 and 54 exteriorly engageable by the pistons 55 and 56 mounted in the cylinder brackets 57 and 58 carried by the bed 20. Also carried by the bed within the gap between the arms 53 and 54 is a valve block 59 mounting the circuit selector plunger valve 60 the inner faces of the arms 53 and 54 constituting trip means for oppositely actuating said valve. The machine is suitably provided with a tank 61 from which a pump 62 delivers operating fluid through the branches 63 and 64 to the porting grooves 65 and 66 within the valve block 59. The pressure at which said fluid is delivered is determined by the relief valve 67.

In Figure 2 the various parts are shown in their left hand position, such as would result from a tripping action effected by movement of the table 21 toward the left witht the result that the table may now be considered as moving toward the right with the trip dog 28 approaching the trip wing 27 of the control trip 26. Interengagement of these parts caused by table movement will initiate counterclockwise rotation of the member 26 as viewed in Figure 7 and arm 30 will start movement of the control rod 24 in a right hand direction. This will cause interengagement of the beveled corner 48 with the lower end 50 of valve 52 to raise the valve against the stabilizing pressure of the spring 68. It will be noted that the pump pressure is at this time connected by way of the cannelure or groove 65 of valve 60 and conduit 70 with groove 71 of valve casing 72. Upward movement of the valve will, therefore, close off the porting to reservoir conduit 73 and couple conduit 70 with conduit 74 extending to the rear end of cylinder 57. The introduced pressure will immediately react against piston 55, effecting power movement of the member 46 and rod 24 to the right, carrying the high point of cam 40 past detent 41 or across the dead center position so that the member 24 and thus the connected selector mechanism in casing 36 will be rapidly fired to its new or reverse position, relieving the dog 28 of the slower, more laborious, and less accurate gradual carrying over of the parts past dead center and with greatly improved accuracy and sensitivity of operation.

As the member 46 and associate parts complete their snapover movement for effecting in this instance the reversal of direction of movement of the work supporting table 21, arm 53 will engage the left hand end of valve element 60 which is at its left hand position due to the movement to the right of the arm 54 of the member 46, snapping this valve to its right hand position where it will be retained by the ball detent 75. This movement of the valve shuts off the pump flow as respects conduit 63 and couples previous pressure conduit 70 to reservoir 76, relieving the pressure against piston 55. This movement of the valve, however, couples branch conduit 64 with conduit 77 extending to port 78 in the valve casing of valve 51. Prior, however, to such coupling the movement of 46 to the right has been of sufficient extent that the tip 49 of valve 51 will have ridden down, the inclined surface 47 occupying under the change of conditions a position corresponding to the position shown of valve 52 at the right of Figure 2. This position is such that the upper portion of the valve blocks off any flow through conduit 77 while coupling the conduit 80 from cylinder 58 with the reservoir connection 73.

It will be evident that the described shifting of the valve mechanisms reconditions the circuit for reverse operation in that a condition has been established in which pressure is now coupled with the left hand control valve in a manner similar to that previously described and illustrated in Figure 1 as existing with respect to the right hand valve. Consequently, reverse trip initiated operation of the member 46 will shift valve 51 to couple this actuating pressure by way of conduit 80 into cylinder 58, reacting on member 56 to reestablish the operative relationship of the parts indicated in Figure 2.

It will be appreciated that it is desirable that this power or self-energizing detent structure be capable of utilization in connection with the rotary or oscillatory control movement of the member 24, as well as with its longitudinal movement. A structure for attainment of this result is particularly illustrated in connection with Figures 4 and 5, it being understood that vertical movement of the plunger 26 as effected by the dogs 34 and 35 on the table 21 will raise or lower the plunger and that arm 30 in this event will react on collar 32 to cause necessary oscillatory movement to be translated to the trip rod 24 and thus by way of arm 39 to the selector mechanism 37 for effecting its oscillatory movement. As has been described, and as illustrated in Figure 18, oscillatory movement of the member 24 causes high point on cam 43 initially to react against detent 44, forcing same outward against the action of spring 45. When the amount of oscillatory movement has been sufficient, the reaction of 44 on the opposite side of the high point of cam 43 will effect the continued firing movement of the parts.

To increase the accuracy of trip operation and release the power strain on the dog actuatable elements, there has been shown in Figure 4 as secured on the trip shaft 24 a collar 81 having a slot as at 82, receiving the control ball 83 at the end of arm 84 of the control disc 85. This slotted construction makes possible the reciprocating movement of member 24 without in any way affecting the position of the members 83—84. The member 85 is suitably supported from the bed 20 for rotary movement by the pintle 86 so that rocking movement of member 81 will be effective through arm 84 to impart a similar rocking movement to the member 85, the pivot axis of member 86 preferably intersecting the axis of rotation of member 24 for simplification of corresponding movements.

As shown in Figure 5, the member 85 has an arcuate surface provided with a notch at 87 and a pair of projecting arms 88 and 89. The parts are there indicated in the position occupied when the rod 24 has been oscillated in a clockwise direction as viewed in Figures 13 to 16, for example, causing a counterclockwise movement or opposite direction of oscillation of the member 85 to a position in which the terminal portion 90 of the valve plunger 91 has dropped into notch 87. In this position of the parts arm 89 has moved the selector valve plunger 92 toward the left, disconnecting the branch pressure conduit 93 as respects conduit 94 extending to valve casing 95 and connecting branch pressure conduit 96 by way of conduit 97 to the casing 98 for valve 91 which is held inwardly in the casing by spring 99 so that its spool closes off any pressure flow. However, when the trip plunger 26 is raised to effect counterclockwise rotation of member 24, oscillation of control disc 85 moves valve 91 outwardly when pressure conduit 97 will be connected by the valve to conduit 100 extending to cylinder 101 to effect a projection or outward movement of the piston 102. This piston has the rod 103 pivoted to arm 88 so that immediately upon sufficient movement being imparted to disc 85 to effect outward movement of the valve 91, pressure reaction on piston 102 will continue the movement of member 85 and thus through arm 83 the dog or manually initiated oscillatory movement of member 24, correspondingly to shift the selector mechanism 36. The cylinder 101, like cylinder 106A for piston 106, is pivotally supported to permit arcuate movement of the end of the rod as the disc 85 oscillates. As the parts are fired by hydraulic pressure into their new position, arm 89 will have been moved away from the selector valve 92 and arm 88 will contact the valve, moving it from its left hand to its right hand position where it will be sustained by the detent 104.

This will disconnect power line 96 from conduit 97, connecting 97 to reservoir conduit 105 and at the same time connecting 93 with 94 for potential subsequent reaction on piston 106 which is coupled with the arm 89. Due, however, to the fact that by this time the plunger terminus 107 of the valve 108 in casing 95 has moved into notch 87 so that the valve spool 109 closes off the pressure conduit 94 there will be no reaction on the piston 106 until such time as initial counterclockwise movement of the disc 85 as viewed in Figure 5 shifts the valve spools 108 and 109 outward into the position as shown in Figure 5. It will thus be evident that the manner of control and selective connection of the power source with one or the other of the linkage actuated trip valve mechanism corresponds in general structure and operative effect to the mechanism previously described for control of the longitudinal reciprocations of member 24.

An alternative embodiment of the principles of the present invention has been illustrated in connection with Figures 6 to 10. Figures 6 to 10 relate particularly to the control of the longitudinal movement of rod 24 including the employment of a trip block 110 similar to the block 46 of Figure 2 and carried by the member 24. In this particular form, the trip block 110 is provided with the double beveled trip 111 reacting on plunger 112 of limit switch 113, serving to raise the limit switch and close the circuit from line 114 to line 115 as the member 111 passes beneath the plunger 112. The member 110 is further provided with the notch 116 receiving the roller terminus of arm 117 on the two position limit switch 118 which selectively couples 115 by way of line 119 to solenoid 120 or by way of line 121 to solenoid 122, the solenoids being coupled in parallel to line 123 and by way of switch 124 to the line 125 of the electrical control circuit. With the parts in the position shown in Figures 6 and 10, dog initiated movement of member 24 toward the right will cause 111 to actuate the limit switch 112, thus energizing solenoid 120 which will react to move valve 126 toward the right and coupling pressure conduit 127 to conduit 128 so that the hydraulic pressure may react on piston 129, power shifting or firing the member 110 and thus the connected rod or member 24 to the right. As member 112 rides off the dog element 111, the limit switch 113 will move to its open position, deenergizing 120 whereupon the springs 130 and 131 will reestablish the centralized position of valve 126 as shown in Figure 6.

During the final portion of movement of the member 110 to the right, the shoulder of the notch 116 constitutes a trip means which will react on 117, shifting the arm of limit switch 118 to the right, interrupting the circuit 115—119 and establishing the circuit 115—121, conditioning the solenoid 122 for subsequent activation. When the member 112 is again raised as by movement of 111 toward the left, this newly established circuit will then be effective to energize solenoid 122, moving valve 126 to the left, energizing the power circuit through 127 and 130' to energize piston 131' and accentuate the firing shift of member 24.

The electro-hydraulic control for oscillatory movement of 24 is similar to that just described in that use is made of the oscillatable disc 132 corresponding to the disc 85 previously described, this disc being provided with the double tapered trip dog or lug 133 for reaction on the plunger 134 of limit switch 135 corresponding to the limit switch 113 just described. The disc is also provided with the elongated notch 136 for reaction on the arm 137 of the selecting limit switch 138. The electrical hook-up of these limit switches with the solenoids 139 and 140 controlling the valve 141 corresponds to that just described in connection with Figure 10, the limit switch 135 in either direction of oscillation of disc 132 comprising the actuator, and solenoid 138 the selector, for determination of operation of solenoid 139 or 140. Corresponding solenoid actuation temporarily shifts valve 141 to couple the pump pressure line 127 with either conduit 142 for pressure actuation of piston 143 or conduit 144 for pressure actuation of piston 145.

These pistons react on disc 132 in a manner similar to the reaction of the pistons 102 and 106 on disc 85 to provide the desired power firing or oscillatory movement of the rod 24.

In Figures 11 to 17 inclusive there has been illustrated one form of compact embodiment of the above described principles of the present invention, particularly adaptable for application to existing machines. As there shown, there is mounted on the rod 24 a control block comprising the sections 146 and 147 bolted together as a unit around rod 24. The block 147 is provided with a recess 148 of appreciable axial extent and limited radial extent. This recess receives a roller on the arm 149 of the limit switch 138. Adjacent the recess, the member 147 is additionally provided with the elongate rib 150 corresponding to the part 133 of Figure 9 for control of the plunger 134 of limit switch 135. It will be noted that these parts are so arranged and located that the limit switches will be unaffected by longitudinal movement of the member 24 but will be actuable by oscillatory movements of the member. Additionally, the member 147 is provided with the elongated slot 151 corresponding to the notch 116 of member 110, permitting limited longitudinal movement of the member 147 and free rotative movement thereof with respect to the arm 117 of limit switch 118 while effecting ultimate shifting of the arm upon longitudinal movement as previously described. Terminally, member 147 is provided with the arcuately extending rib 152 corresponding to the part 111 of Figure 6 for free oscillation with respect to the plunger 112 of limit switch 113 while effective to actuate this plunger when the member 24 and element 147 are given a longitudinal movement.

Figures 16 and 17 show a simplification of the firing controls for the longitudinal and oscillatory movements of the member 24 in that there is secured on 24 the member 153 having an actuating head 154 disposed between the longitudinal movement control plungers 129 and 131' which determine its longitudinal positioning and likewise between the plungers 143 and 145 for determination of the rotational or oscillatory positionings of the head 154 and thus of the rod 24. It will be understood that the electrical and hydraulic couplings between these elements are those which have been shown and described in detail in connection with the operational diagrams, Figures 6 and 9, and the functioning of these several parts is in accordance with what has there been described.

From the foregoing description it will be evident that the present invention provides novel and improved power means positively to effect and complete initial table dog and trip plunger initiated movements of a control linkage for a rate and direction determining selector means of a machine tool. It will further be noted that not only is the machine control structure new as an entirety but that the invention contemplates and discloses certain structural elements capable of separate production and manufacture as a control mechanism which can be applied to existing machine tools and which sub-combination of elements in themselves constitute a novel and improved operative combination and article of manufacture.

Particular attention is invited to the fact that the present structure is responsive to slight or limited table dog initiated power impulses and that the self-energizing detent and firing mechanism so provided, not only in a particular movement takes care of the completion of the desired shifting movement of the machine selector, but at the same time effects a selective reconditioning or setting up of the operative interconnection of the several parts to render the same effective to produce a different reaction on the selector for a corresponding reaction as respects the control elements.

What is claimed is:

1. A machine tool including a transmission controlling selector, a trip plunger, linkage connecting the plunger and selector for operation of the selector by the plunger, a load and fire detent mechanism coupled with the linkage for completion of plunger initiated movement thereof, a trip carried by and movable with the linkage, a pair of plunger valves, a source of hydraulic power, a circuit selector for alternative coupling of the source of power with one or the other of said valves, a power shifting means for the linkage couplable with the source of power by way of the valves, and an actuating means carried by the linkage and positioned to engage the circuit selector during movement of the linkage to determine its effective coupling position as respects one or the other of said valves.

2. A machine tool including an oscillatable and axially translatable selector, linkage coupled with the selector for effecting said axial and oscillatory movements of the selector, and control means for the linkage including a first pair of translating pistons, a second pair of oscillation controlling pistons, a source of power, a first pair of valves for controlling the translating pistons, a second pair of valves for controlling the oscillation controlling pistons, means for initiating shifting movements of the linkage, trips carried by the linkage for movement therewith having valve operating portions shiftable into engagement with the first pair and the second pair of valves by movement of the linkage, and presettable valve means for determining the selective coupling of the source of power with the piston controlling valves.

3. A machine tool including an oscillatable and axially translatable selector, linkage coupled with the selector for effecting said axial and oscillatory movements of the selector, and control means for the linkage including a first pair of translating pistons, a second pair of oscillation controlling pistons, a source of power, a first pair of valves for controlling the translating pistons, a second pair of valves for controlling the oscillation controlling pistons, means for initiating shifting movements of the linkage, trips carried by the linkage for movement therewith having valve operating portions shiftable into engagement with the first pair and the second pair of valves by movement of the linkage, a presettable valve means for determining the selective coupling of the source of power with the valves for controlling said pistons, and linkage actuatable means for effecting variable positioning of the presettable valve means.

4. A machine tool control mechanism including an oscillatable axially shiftable selector rod having a radially projecting arm, a first pair of opposed pistons supported oppositely to react on said arm to effect axial movements of the rod, a second pair of opposed pistons disposed to react on the arm to effect oscillatory movements thereof, and means to control the reaction of the pistons on the arm including a trip block carried by the rod having a pair of sector shaped slots formed therein, one of the slots having arcuately spaced trip engaging shoulders and sufficient axial extent to avoid trip contact during normal axial movement of the rod, the other of said slots having axially spaced trip engaging shoulders and sufficient arcuate extent to avoid trip contact during normal oscillatory movement of the rod, said trip block having an axially extending rib and an arcuately extending rib, a control block for cooperation with said trip block having a first trip arm pivoted to swing about an axis parallel to that of the rod and a portion of less width than the arcuate spacing of the shoulders, said arm extending into said one of the slots, a second trip arm pivoted to the block for movement about an axis transverse to the pivot axis of the first trip arm and having a portion of less width than the axial spacing of the shoulders of said other slot, said second arm projecting into said other slot, and a pair of depressible plungers extending into engagement with the trip block adjacent said ribbed portions whereby the axially extending rib will actuate one of said plungers upon oscillation of the block and the arcuately extending rib will actuate the other of said plungers upon axial movement of the trip block, and operative connections between said pistons and plungers for effecting power movements of the selector rod upon actuation of the plungers by oscillatory and axial movements of the trip block.

5. A machine tool cycle control mechanism including an axially movable selector shifting rod, a first means for initiating axial movement of the rod, and additional means for completing said initiated movement, said additional means including a trip carried by and movable with the rod, an actuating piston for the rod, power means for operation of the piston including a hydraulic circuit, a plunger operable valve in the circuit having a contact portion projecting into the path of movement of the trip for actuation thereby, a second valve serially arranged with the plunger valve in the hydraulic circuit and shiftable to connect and disconnect the circuit as respects the piston, and means on the rod for shifting said second valve into disconnecting position as respects the plunger operable valve upon power shifting of the rod.

6. A machine tool cycle control mechanism including an axially movable selector shifting rod, a first means for initiating axial movement of the rod, and additional means for completing said initiated movement, said additional means including a trip carried by and movable with the rod, a first actuating piston for the rod, power means for operation of the piston including a hydraulic circuit, a first plunger operable valve in the circuit having a contact portion projecting into the path of movement of the trip for actuation thereby, a second valve serially arranged with the plunger valve in the hydraulic circuit and shiftable to a position to connect and another position to disconnect the circuit as respects the piston, means on the rod for shifting said second valve into disconnecting position as respects the plunger operable valve upon power shifting of the rod, a second piston for effecting opposite movement of the rod, a second plunger operable valve for determining the actuation of said additional second piston and an actuating circuit intervening the piston and said second plunger operable valve including conduit connections completeable by way of said serially arranged valve when the same is moved into disconnecting position as respects the circuit controlled by the first plunger operable valve.

7. A machine tool cycle control mechanism including a shiftable selector control rod, a control trip carried by the rod having a pair of plunger control portions, a power source a power shifter for the rod, and means for determining the shifting of the rod by the power shifter including a first power shifter control plunger carried by the machine in position for actuating engagement by one of the control portions of the trip to initiate operation of the power shifter means controlled by the plunger to effect a coupling of the power source with the shifter for actuation thereof, a second control plunger carried by the machine in proximity to the first plunger for actuation by the trip, the relative location of the first and second control plungers and the respective plunger control portions of the trip being such that the second plunger will be actuated by the trip subsequent to the trip effected actuation of the first plunger, and means actuatable upon movement of said second plunger for interrupting the effective coupling between the power shifter and the power source effected by the first plunger.

8. A machine tool cycle control mechanism including a shiftable selector control rod, a control trip carried by the rod having a pair of plunger control portions, a power source of power shifter for the rod, and means for determining the shifting of the rod by the power shifter including a first power shifter control plunger carried by the machine in position for actuating engagement by one of the control portions of the trip to initiate operation of the power shifter means controlled by the plunger to effect a coupling of the power source with the shifter for actuation thereof, a second control plunger carried by the machine in proximity to the first plunger, the relative location of the first and second control plungers and the respective plunger control portions of the trip being such that the second plunger will be actuated by the trip subsequent to the trip effected actuation of the first plunger, means actuable upon movement of said second plunger for interrupting the effective coupling between the power shifter and the power source effected by the first plunger, an alternatively available reversing control circuit for the power shifter, and coupling means activated by completion of the sequential movement of the second plunger for coupling said reversing control circuit with the first-mentioned power shifter control plunger.

9. A machine control system including a shiftable selector, linkage coupled with the selector for effecting variable positioning thereof, means for initiating selector shifting movement of the linkage and means coupled with the linkage for completing the initiated movements of said linkage, said means comprising a control mechanism including a plurality of power actuators for effecting movement of the linkage, a power circuit, trip means carried by the linkage and actuable by initial movements of the linkage, a control plunger associated with and individual to each actuator, said plungers being shiftable by the trip means to couple the power circuit with their respective associated actuators, means supporting said plungers in position for selective actuation by the tripping means upon initial movement of the linkage and selector means interposed in the power circuit and operable by actuator effected movement of the linkage to interrupt the power circuit coupling between a selectively actuated individual plunger and its associated power actuator.

References Cited in the file of this patent

UNITED STATES PATENTS

| | | |
|---|---|---|
| 119,590 | Evans | Oct. 3, 1871 |
| 194,672 | Guild | Aug. 28, 1877 |
| 999,711 | Gage | Aug. 1, 1911 |
| 1,978,353 | Nenninger et al. | Oct. 23, 1934 |
| 2,019,486 | Ernst et al. | Nov. 5, 1935 |
| 2,072,325 | Woodcock | Mar. 2, 1937 |
| 2,193,193 | Fletcher | Mar. 12, 1940 |
| 2,198,102 | Armitage | Apr. 23, 1940 |
| 2,605,678 | Armitage et al. | Aug. 5, 1952 |